Figure 1:
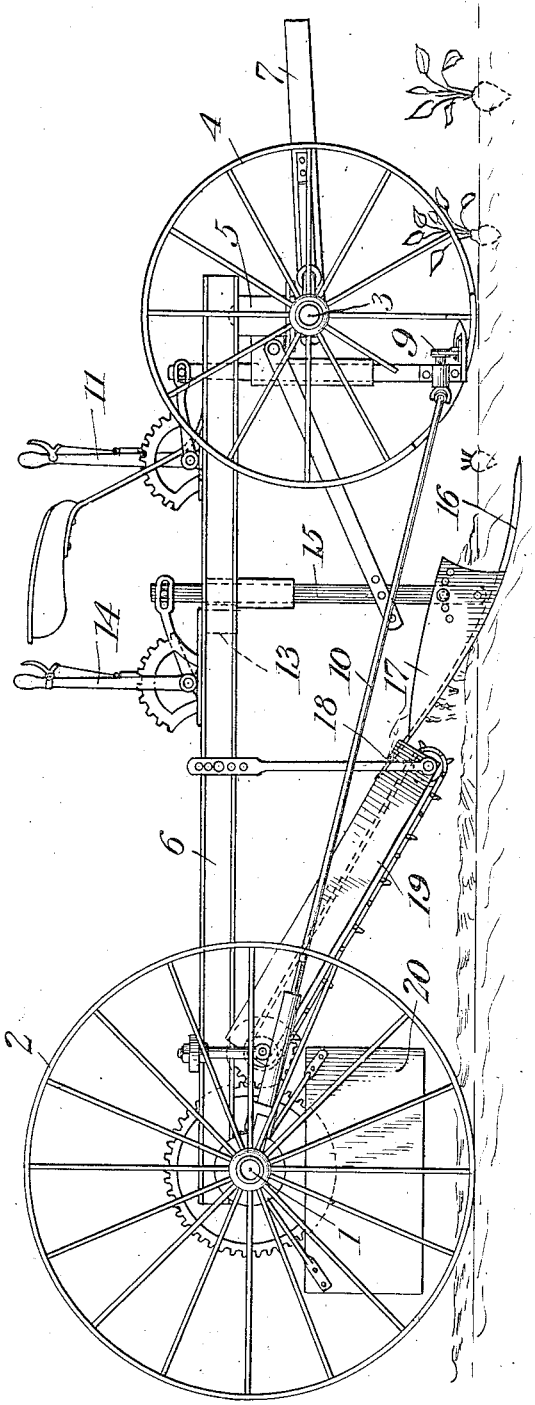

E. P. LE COMPTE.
BEET HARVESTER.
APPLICATION FILED DEC. 31, 1912. RENEWED AUG. 21, 1914.

1,117,065.

Patented Nov. 10, 1914.

2 SHEETS—SHEET 1

WITNESSES

INVENTOR
Edward Palmer Le Compte
By William W. Deane
his Attorney

E. P. LE COMPTE.
BEET HARVESTER.
APPLICATION FILED DEC. 31, 1912. RENEWED AUG. 21, 1914.

1,117,065.

Patented Nov. 10, 1914.
2 SHEETS—SHEET 2.

Witnesses
Inventor
Edward Palmer Le Compte
By William W. Deane
his Attorney

UNITED STATES PATENT OFFICE.

EDWARD PALMER LE COMPTE, OF PARK CITY, UTAH.

BEET-HARVESTER.

1,117,065. Specification of Letters Patent. Patented Nov. 10, 1914.

Application filed December 31, 1912, Serial No. 739,547. Renewed August 21, 1914. Serial No. 857,948.

*To all whom it may concern:*

Be it known that I, EDWARD P. LE COMPTE, a citizen of the United States, residing at Park City, in the county of Summit and State of Utah, have invented certain new and useful Improvements in Beet-Harvesters, of which the following is a specification.

This invention has relation to beet harvesters and has for its object to provide a machine of simple structure adapted to be drawn along a row of beets, the said machine having a cutting apparatus adapted to remove the tops or foliage from the beets. The machine is further provided with a share which is adapted to pass under the beets while they are still in the row. At the back of the said share is a series of sifting bars arranged parallel with the line or draft of the machine and between which the soil is adapted to sift as the beets are lifted and deposited upon an elevator. The elevator is located immediately behind the delivery ends of the said bars and is adapted to carry the beets up and deposit the same in a receptacle carried at the rear part of the machine. Means are provided for operating the cutting apparatus of the elevator from the supporting wheels of the machine.

With these and other objects in view, the invention consists in certain novel features of construction as hereinafter shown and described, and then particularly pointed out in the claim and in the drawings illustrative of the preferred embodiment of the invention.

Figure 2:
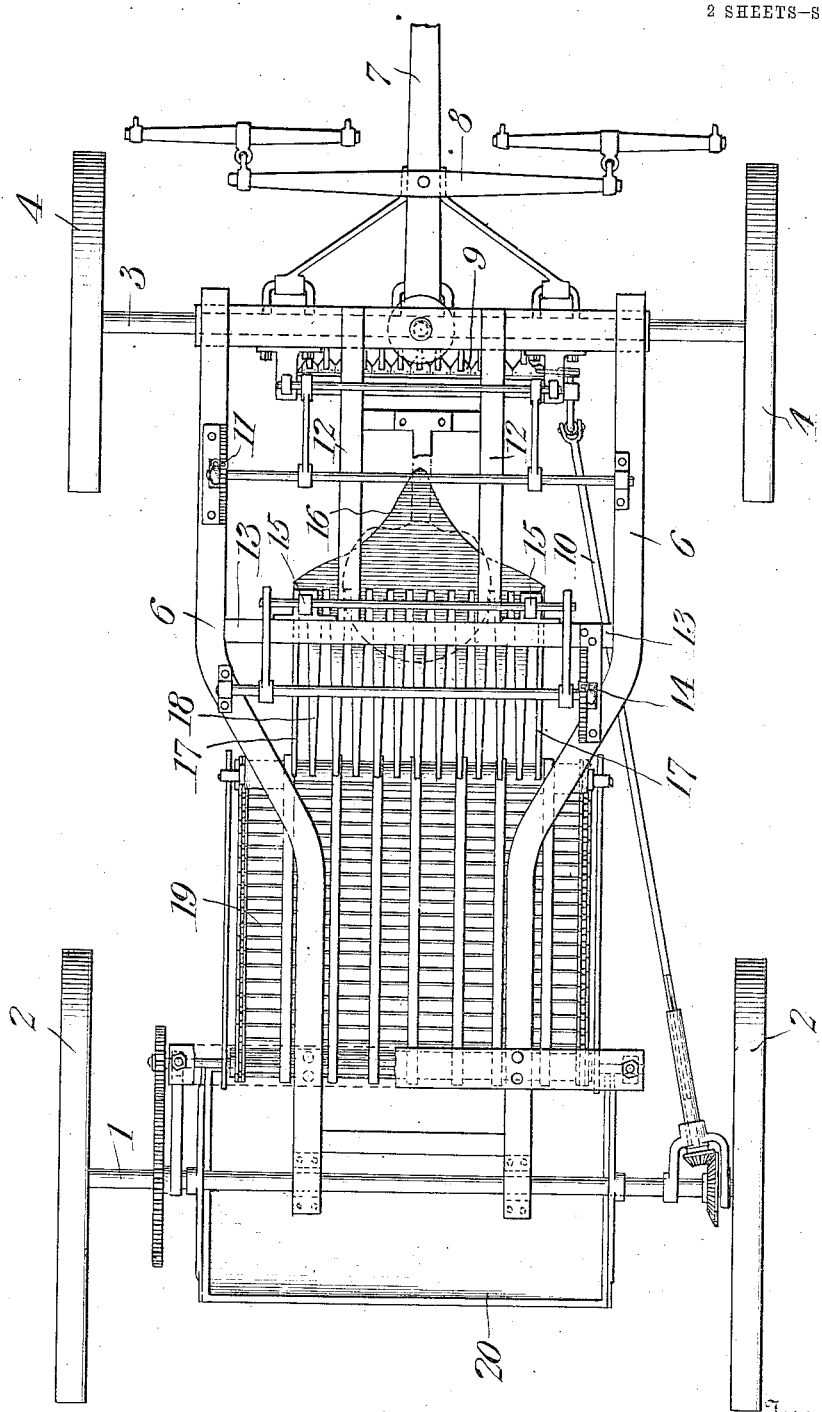

Figure 1 is a side elevation of the beet harvester. Fig. 2 is a top plan view of the same.

Corresponding and like parts are referred to in the following description and indicated in all the views of the accompanying drawings by the same reference characters.

The machine includes a rear axle 1 having traction wheels 2 mounted upon the ends thereof. The axle 1 is designed to rotate in unison with the wheels 2. A front axle 3 is supported upon the wheels 4 and is pivoted at a point between these ends to a bolster 5. Coupling bars or pulls 6 connect the bolster 5 with the rear axle 1. The intermediate portions of the coupling bars or pulls 6 are outwardly bowed as illustrated in the drawing. A draft pole 7 is connected with the front axle 3 and carries a double-tree 8 to which draft animals may be attached in the usual manner. A cutting apparatus 9 is supported below and from the bolster 5. Said apparatus is of the usual pattern such as is generally employed by mowers or reapers and is operated by means of a shaft 10 from the rear axle 1. A lever mechanism 11 is mounted upon the bars 6 and is operatively connected with the cutting apparatus 9 and may be employed for raising or lowering the said cutting apparatus and for holding the same at an adjusted position with relation to the surface of the ground. Rearwardly extending bars 12 are connected at their front ends with the bolster 5 and the transverse bar 13 is connected with the rear ends of the bars 12 and in turn the ends of the bar 13 are connected with the intermediate parts of the bowed portions of the coupling bars 6. This arrangement materially strengthens and braces the forward portion of the frame of the machine. The forward part of the machine is subjected to the greatest strain while the machine is in operation and during the cutting of the tops of the beets and the plowing of the same. A lever mechanism 14 is mounted upon the forward part of the frame of the machine and is connected with standards 15 which in turn carry at their lower ends a digging share 16. The standards 15 are provided at their lower ends with rearwardly disposed guides 17 which are adapted to enter the furrow opened by the share 16 and prevent the walls of the furrow from caving in while the share is cutting the same and immediately thereafter. Inclined bars 18 are located at the rear edge of the share 16. These bars are spaced from each other and serve as means for lifting the beets after the share passes under the same and for permitting the soil to sift through and deposit in the furrow during the lifting of the beets. By means of the lever mechanism 14 the standards and the parts connected thereto may be raised or lowered so that the share may operate at any desired distance below the surface of the soil or may be positioned entirely above the soil if desired. An elevator 19 is located immediately behind the delivery ends of the bars 18. This elevator may be of any usual pattern and is operatively connected with the rear axle 1 in any usual manner. A receptacle 20 is carried by the rear axle 1 and the delivery end of the elevator 19 is arranged to discharge the beets into the said receptacle. Any suitable means may be provided for emptying the receptacle 20 at desired times. Therefore it will be seen that a simple and effective beet harvester is provided and that the frame of the said harvester is so constructed as to effectually withstand the strains. At the same time the harvester is of simple construction and may be made of comparatively light material.

Having described the invention what is claimed is:

A beet harvester comprising a frame, having side bars provided with outwardly bowed intermediate portions, a cross bar connected at its ends with the intermediate portions of said outwardly bowed parts of the side bars, bars secured at their forward ends and the forward part of the frame and at their rear ends to the cross bar, a cutting apparatus connected with a forward part of the frame and the digging apparatus connected with the frame and located between the outwardly bowed portions of the side bars.

In testimony whereof I affix my signature in presence of two witnesses.

EDWARD PALMER LE COMPTE.

Witnesses:
    HENRY SHIELDS,
    CHAS. T. PRISK.